United States Patent [19]

Sato et al.

[11] 4,321,345

[45] Mar. 23, 1982

[54] METHOD FOR PRODUCING α-OLEFIN POLYMERS

[75] Inventors: Akihiro Sato, Chibaken; Masami Tachibana; Kazutsune Kikuta, both of Ichiharashi, Japan

[73] Assignee: Chisso Corporation, Osaka, Japan

[21] Appl. No.: 21,570

[22] Filed: Mar. 15, 1979

[30] Foreign Application Priority Data

Aug. 31, 1978 [JP] Japan ................. 53-106797

[51] Int. Cl.$^3$ ................. C08F 4/02; C08F 10/00
[52] U.S. Cl. ................. 526/115; 252/429 B; 252/429 C; 526/97; 526/114; 526/116; 526/121; 526/122; 526/124; 526/125; 526/348; 526/348.6; 526/351; 526/352
[58] Field of Search ................. 526/97, 114, 115, 122, 526/124, 125

[56] References Cited

U.S. PATENT DOCUMENTS

| | | | |
|---|---|---|---|
| 3,900,454 | 8/1975 | Sato et al. | 526/125 |
| 4,027,087 | 5/1977 | Satoh et al. | 526/124 |
| 4,071,672 | 1/1978 | Kashiwa | 526/125 |
| 4,085,276 | 4/1978 | Toyota et al. | 526/125 |
| 4,103,078 | 7/1978 | Sato et al. | 526/124 |
| 4,107,413 | 8/1978 | Giannini et al. | 526/125 |
| 4,107,414 | 8/1978 | Giannini et al. | 526/125 |
| 4,107,416 | 8/1978 | Giannini et al. | 526/125 |
| 4,143,223 | 3/1979 | Toyota et al. | 526/125 |
| 4,168,361 | 9/1979 | Oda et al. | 526/125 |
| 4,226,741 | 10/1980 | Lusiani et al. | 526/125 |

FOREIGN PATENT DOCUMENTS 1335887 10/1973 United Kingdom ................. 526/125

*Primary Examiner*—Edward J. Smith
*Attorney, Agent, or Firm*—Fred Philpitt

[57] ABSTRACT

A method for producing α-olefin polymers which enables to control molecular weight distribution in a narrower range, with a higher yield and a higher crystallinity of products, is proposed. A catalyst used in said method is also proposed. The solid component of said catalyst is obtained by reacting a trivalent metal halide with a hydroxide, an oxide, a carbonate of a divalent metal, a double compound containing any of these compounds or a hydrate of a compound containing a divalent metal to produce a solid product (I); reacting one or more electron donors and one or more electron acceptors separately or simultaneously each in from one step 10 steps but by using TiCl$_4$ as an acceptor at least in one step, with said solid product (I) to obtain a solid product (II); and then combining an organoaluminum compound and an electron donor with said solid product (II).

15 Claims, No Drawings

METHOD FOR PRODUCING α-OLEFIN POLYMERS

DESCRIPTION OF THE INVENTION

This invention relates to a method for producing α-olefin polymers having narrower molecular weight distribution and higher crystallinity with a higher yield and also to a catalyst used in this method.

α-Olefin polymerizations and α-olefin polymers herein referred to include not only homopolymerizations and homopolymers of α-olefins but also copolymerizations and copolymers thereof with other α-olefin copolymerizable monomers.

There have been proposed various kinds of inventions as those in which an electron-donor is used as one component of a catalyst. For example, there are those in which an electron donor is added as one component to such a component as $MgCl_2$ (anhydrous), a solid containing Mg-Cl bond, magnesium carbonate, an oxide or a hydroxide of a metal of the IInd or VIIIth group of the periodical table or the like as a carrier.

On one hand, we have so far developed as catalysts for polymerizing ethylene or α-olefins including ethylene, those having a transition metal compound carried, in various manners, on a solid product obtained by reacting a trivalent metal halide with a divalent metal compound.

For example, we proposed (1) a method in which a transition metal compound is reacted with the above-mentioned solid product in the presence of an aromatic compound (Japanese patent publication Nos. 10849 of 1972, 13609 of 1972, 16782 of 1974, etc.); (2) a method in which a transition metal compound is reacted with a product obtained by reacting the above-mentioned solid product with a polysiloxane or an electron donor (Japanese patent publication No. 13827 of 1977 and Japanese patent application No. 127750 of 1977); (3) a method in which reaction is carried out by adding to the above-mentioned solid product, a polysiloxane or an electron-donor compound and a transition metal compound simultaneously or by adding a complex of a polysiloxane with a transition metal compound or a complex of an electron-donor with a transition metal compound (Japanese patent publication No. 21246 of 1978, No. 21247 of 1978, No. 32031 of 1978, etc.) and (4) a method in which an electron donor or an electron acceptor is reacted with the above-mentioned solid product in a plurality of steps (Japanese patent application No. 101960 of 1978). We also proposed a method in which such an additive as a titanium alkoxide, silicone oil, a polyethylene glycol dialkyl ether or the like is added (Japanese patent publication No. 13609 of 1972, No. 13772 of 1972, etc.).

We have engaged in the research works on the improvement of these prior art inventions and completed the present invention by finding that much more superior effectiveness can be attained if solid product (II) comprising a reaction product between a trivalent metal halide and a divalent metal compound, an electron donor and an electron acceptor (titanium tetrachloride is used in at least one step) is used in combination with an organoaluminum compound and an electron donor.

The present invention resides in a method for producing an α-olefin polymer or copolymer which is characterized in polymerizing an α-olefin or a mixture of α-olefins in the presence of a catalyst formed by reacting a trivalent metal halide with a hydroxide, an oxide or a carbonate of a divalent metal, a double compound containing any of these compounds, or a hydrate of a compound containing a divalent metal (which compounds will be referred to as a divalent metal compound in a general term) to produce a solid product (I), reacting one or more electron donors and one or more electron acceptors simultaneously or separately with said solid product (I) each in from one step to ten steps but by using $TiCl_4$ in at least one step, to produce a solid product (II), and combining an organoaluminum compound and an electron donor with said solid product (II). Further it resides in the above-mentioned catalyst.

The catalyst components used in the method of the present invention are as follows:

(A) Trivalent metal halide
(B) Divalent metal compound (a hydroxide, an oxide, a carbonate of a divalent metal, a double compound containing any of these compounds or a hydrate of a compound containing a divalent metal)
(C) An electron donor
(D) An electron acceptor
(E) An organoaluminum compound A method for preparing the catalyst used in the present invention will be described.

The solid product (I) is obtained by reacting a trivalent metal halide with a divalent metal compound.

As trivalent metal halide, aluminum trichloride (anhydrous), aluminum tribromide (anhydrous), ferric trichloride (anhydrous), etc. are used.

As divalent metal compounds, hydroxides such as $Mg(OH)_2$, $Ca(OH)_2$, $Zn(OH)_2$, $Mn(OH)_2$ and the like; oxides such as MgO, CaO, ZnO, MnO and the like; double oxides containing a divalent metal oxide such as $MgAl_2O_4$, $Mg_2SiO_4$, $Mg_6MnO_8$ and the like, divalent metal carbonates and double carbonates containing a divalent metal carbonate such as $MgCO_3$, $MnCO_3$ and $MgCO_3.CaCO_3$; hydrates of halides such as $SnCl_2.2H_2O$, $MgCl_2.nH_2O$ (n=1~6), $NiCl_2.6H_2O$, $MnCl_2.4H_2O$, $KMgCl_3.6H_2O$; hydrates of double compounds consisting of a halide and a hydroxide such as $MgCl_2.nMg(OH)_2.mH_2O$ (n=1~3, m=1~6); hydrates of double oxide such as $3MgO.2SiO_2.2H_2O$; hydrates of a double compound consisting of a carbonate and a hydroxide such as $3MgCO_3.Mg(OH)_2.3H_2O$; hydrates of a hydroxide-carbonate containing a divalent metal such as $Mg_6Al_2(OH)_{14}CO_3.4H_2O$ can be mentioned. Among these, divalent metal compounds containing magnesium are most preferable.

As for method for producing a solid compound (I), (1) a method in which a trivalent metal halide and a divalent metal compound are reacted while being milled in a milling apparatus such as a ball mill, a vibrating mill or the like, (2) a method in which a trivalent metal halide and a divalent metal compound are milled and mixed and then reacted on heating, and the like, can be mentioned. The ratio of the amounts of a divalent metal compound to a trivalent metal halide will be sufficient if 0.1~20 mol of a divalent metal compound is used per 1 mol of a trivalent metal halide. In case of reaction carried out under milling, the condition of milling reaction will be sufficient if a temprature is in the range from room temperature (about 20° C.) to 500° C., a time is 5~100 hours for a ball mill and 10 minutes to 50 hours for a vibrating mill. In case of heating after milling, milling is carried out for 5 to 100 hours for a ball mill and 10 minutes to 50 hours for a vibrating mill and then heating is carried out at a temperature from room temperature to 500° C. for 10 minutes to 50 hours.

the solid product thus obtained will be used as a solid product (I).

The solid product is then reacted with an electron donor (C) and an electron acceptor (D).

The electron donors used in the present invention include organic compounds containing oxygen, nitrogen, sulfur or phosphorus.

The electron donors include e.g. esters (the general formula of RCOOR', wherein R and R' are hydrocarbon groups such as alkyl groups, aryl groups or the like in this case as well as in other cases hereinafter follows); alcohols (ROH); ethers (R—O—R'); aldehydes (RCHO); fatty acids (RCOOH); ketones (RCOR'); nitriles (RCN); amines ($R_nNH_{n-3}$ wherein n'=1, 2 or 3, including, in addition to the above-mentioned ones, alcoholamines and cyclic amines); isocyanates (RNCO); azo-compounds (R—N=N—R'); phosphines {$R_nPR'_{3-n}$ (wherein n=1, 2 or 3)}; phosphites {P(OR)$_3$}; phosphinites {RP(OR')$_2$}; thioethers {$R_nSR'_{2-n}$ (wherein n=1 or 2)}; thioalcohols (RSH) and the like. Further polysiloxanes are also used as electron donors. Among these electron donors, esters, alcohols, ethers, ketones, phosphines, polysiloxanes are preferred and esters are used as most preferable compounds.

Concrete examples of electron donors include alcohols such as methanol, ethanol, propanol, butanol, pentanol, hexanol, octanol, phenol, cresol, xylenol, ethylphenol, naphthol and the like; ethers such as diethyl ether, di-n-propyl ether, di-n-butyl ester, di(isoamyl) ether, di-n-pentyl ether, di-n-hexyl ether, di-n-octyl ether, di-i-octyl ether, ethylene glycol monomethyl ether, diphenyl ether, terahydrofuran, anisole, diphenyl ether and the like; esters such as ethyl acetate, butyl formate, amyl acetate, vinyl butyrate, vinyl acetate, methyl benzoate, ethyl benzoate, propyl benzoate, butyl benzoate, octyl benzoate, 2-ethylhexyl benzoate, methyl toluylate, ethyl toluylate, 2-ethylhexyl toluylate, methyl anisate, ethyl anisate, propyl anisate, ethyl cinnamate, methyl naphthoate, ethyl naphthoate, propyl naphthoate, butyl naphthoate, 2-ethylhexyl naphthoate, ethyl phenylacetate and the like; aldehydes such as acetaldehyde, benzaldehyde and the like; fatty acids such as formic acid, acetic acid, propionic acid, butyric acid, oxalic acid, tartaric acid, acrylic acid, maleic acid, benzoic acid and the like; ketones such as methylethyl ketone, methylisobutyl ketone, benzophenone and the like; nitriles such as acetonitrile; amines such as methylamine, diethylamine, tributylamine, triethanolamine, pyridine, aniline, dimethylaniline and the like; isocyanates such as phenylisocyanate, toluylisocyanate and the like; azo-compounds such as azobenzene and the like; phosphines such as ethylphophine, triethylphosphine, tri-n-butylphosphine, tri-n-octylphosphine, triphenylphosphine and the like; phosphites such as dimethylphosphite, di-n-octylphosphite, tri-n-butylphosphite, triphenylphosphite; phosphinites such as ethyldiethylphosphinite, ethyldibutylphosphinite, phenyldiphenylphosphinite and the like; thioethers such as diethyl thioether, diphenyl thioether, methyl phenyl thioether, ethylene sulfide, propylene sulfide and the like; and thioalcohols such as ethylthioalcohol, n-propylthioalcohol, thiophenol and the like.

As polysiloxanes, chain or cyclic siloxane polymers represented by the general formula of

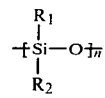

(wherein n is from 3 to 10,000; $R_1$ and $R_2$ represent the same or different substituents capable of connecting with silicon) are used, but above all those wherein $R_1$ and $R_2$ are each one hydrogen, a hydrocarbon radical such as an alkyl, an aryl or the like, halogen, an alkoxy group, an aryloxy group, a carboxylic group or more than one, the foregoing members are connected and distributed in a molecule in various ratios, are used. Customarily used polysiloxanes are those in which each R of the above-mentioned formula is a hydrocarbon group. As concrete examples, alkylsiloxane polymers e.g. a lower polymer such as octamethyltrisiloxane, octaethylcyclotetrasiloxane and alkylsiloxanes such as dimethylpolysiloxane, ethylpolysiloxane, methylethylpolysiloxane, arylsiloxane polymers such as hexahexylcyclotrisiloxane, diphenylpolysiloxane; alkylarylsiloxane polymers such as diphenyloctamethyltetrasiloxane, methylphenylpolysiloxane are illustrated. Further, alkylhydrogensiloxane polymers wherein $R_1$ is hydrogen or halogen and $R_2$ is a hydrocarbon group such as an alkyl group, an aryl group or the like or haloalkylsiloxane polymers or haloarylsiloxane polymers can also be mentioned. Further polysiloxanes wherein R is an alkoxy or an aryloxy group or a residual group of fatty acid, are also useful. As for the viscosity of polysiloxanes, a value in the range of from 10 to 10,000 centistokes at 25° C. preferably from 10 to 2,000 centistokes is suitable.

These electron donors can be used in the form of a mixture.

The electron acceptor (D) used in the present invention includes halides of a metal of the IIIrd to VIIIth group of the periodical table. For example, AlCl$_3$ (anhydrous), SiCl$_4$, SnCl$_2$, SnCl$_4$, TiCl$_4$, ZrCl$_4$, PCl$_3$, PCl$_5$, VCl$_4$, SbCl$_5$, SCl$_2$, MnCl$_2$, FeCl$_2$, NiCl$_2$ and the like can be illustrated. These can also be used in the form of a mixture. Among the electron acceptors, AlCl$_2$ (anhydrous), SiCl$_4$, SnCl$_2$, SnCl$_4$ and TiCl$_4$ are preferably used.

When a solid product (I) is reacted with an electron donor and/or an electron acceptor, a solvent can be used. A solvent can be used also for washing after reaction. As such a solvent, aliphatic hydrocarbons such as n-pentane, n-hexane, n-heptane, n-octane, i-octane, n-nonane, n-decane and the like, aromatic hydrocarbons such as benzene, toluene, xylene, ethyl benzene, cumene and the like and halogenated hydrocarbons such as carbon tetrachloride, chloroform, dichloroethane, trichloroethylene, tetrachloroethylene, carbon tetrabromide, chlorobenzene, orthodichlorobenzene or the like (hereinafter these compounds will be referred simply to as a solvent).

As for a method for reacting a solid product (I) with one or more electron donors and also with one or more electron acceptors each in steps of from one to 10 and by using titanium tetrachloride as an electron donor at least in one step, various kinds of modes such as those hereinafter described can be adopted.

As for the state under which a reaction is carried out, the reaction can be carried out in suspension state in the presence or absence of a solvent (hereinafter referred to sometimes as a suspension reaction) or the reaction can be carried out simultaneously with milling by using a mill such as a vibrating mill, ball mill or the like (hereinafter referred to sometimes as a milling reaction). Suspension reaction and milling reaction can be combined. Hereinafter reaction includes any of the modes of suspension reaction, milling reaction and a combination of the two modes.

When more than one electron donors (C) are used, they can be used in the mixed state but when a reaction in which (C) is used in more than one step, two kinds of (C) can be used either in the mixed state or separately in each step.

In the present invention, titanium tetrachloride as an electron acceptor (D) is always used, and those (D) other than titanium tetrachloride is used when more than one (D) are used. When more than one (D) are used, they can be used in the form of a mixture. When the reactions in which (D) is used, are carried out in a plurality of steps more than one (D) can be used in the form of a mixture or in separate form. The reaction in which (D) is used is carried out in one or a plurality of steps, and titanium tetrachloride is used as (D) in at least one step. In that case, it is preferable to use as (D), titanium tetrachloride alone, but it is possible to use a mixture with another electron acceptor having a mixing ratio of titanium tetrachloride of 20% by weight or more. In the description of the reaction in which (D) is used, when "titanium tetrachloride" is referred to as (D), it is intended to include the above-mentioned mixture besides titanium tetrachloride alone.

As for the order of addition or reaction of the three substances to be reacted, various kinds can be mentioned, but as some representative examples, the following methods can be mentioned:

(1) As for methods for reacting (C) and (D) with a solid product (I) in one step, there are following modes:

(1-1) A method in which three members of a solid product (I), (C) and (D) are added and reacted in an optional order.

(1-2) A method in which a solid product (I) is reacted with a reaction product between (C) and (D).

(1-3) A method in which (C) is reacted with a solid product (I) and then (D) is reacted.

(2) A method in which, when (C) and (D) are reacted with a solid product (I), either one or both of (C) and (D) are used in two steps or more, and at least in one step, $TiCl_4$ is used as (D). There are following modes in this method:

For example, (2-1) A method in which (C) is reacted with a solid product (I) and then (D) is reacted in two steps or more;

(2-2) A method in which $C_1$ is reacted with a solid product (I) and then ($C_2$) and (D) are reacted according to a method of (1);

(2-3) A method in which ($D_1$) is reacted with a solid product (I) and then (C) and $D_2$ are reacted according to a method of (1);

(2-4) A method in which ($C_1$) and ($D_1$) are reacted with a solid product (I) according to a method of (1) and then ($D_2$) is reacted in one or more steps;

(2-5) A method in which ($C_1$) and ($C_2$) in the coexistent state are reacted with a solid product (I), or stepwise ($C_1$) and then ($C_2$) are reacted with the solid product (I), then ($D_1$) is reacted and then ($D_2$) is reacted in one or more steps;

(2-6) A method in which ($C_1$) is reacted with a solid product (I), ($C_2$) is reacted, and then ($C_3$) and (D) are reacted according to the method of (1); and (2-7) A method in which ($C_1$) and ($D_1$) are reacted with a solid product (I) according to a method of (1), and then ($C_2$) and ($D_2$) are reacted according to a method of (1).

In the above-mentioned descriptions of various modes, a phrase "then . . . is reacted" or a word "step" of reaction means one end of reaction operation and it is to be noted as a general practice that unreacted products or unnecessary reaction products are removed after termination of reaction each time when reactions are carried out in two or more steps. With regard to the removal operation of the above-mentioned materials, if the greater part of objective materials of removal is in the form of liquid by themselves or soluble in a solvent and a solvent is used in a reaction, such a process as decantation, filtration or evaporation to dryness can be used because the materials are in liquid state, or the above-mentioned process can be applied after addition of a solvent even when a solvent is not used in a rection. In such a case, the removal of unreacted products or unnecessary reaction products does not require strictness. Accordingly, if an amount of (C) or (D) used in a reaction is small and unreacted products and unnecessary products are almost none or slight, shift to a next reaction can be made by omitting the removal operation. In the mode (1-2), the reaction product between (C) and (D) can be obtained by mixing (C) and (D) but in this case a solid product (I) can be added in the state where unreacted products, etc. are present.

Further in the above-mentioned description, ($C_1$), ($C_2$), etc. and ($D_1$), ($D_2$), etc. means that different kinds of (C) or (D) are used. Same kind of (C) or (D) means not only a single compound but also a mixture of two or more single compounds. However, if two or more kinds of (D) are used such as ($D_1$), ($D_2$), etc., at least one of them is $TiCl_4$.

As for steps of reaction of (C) or (D), the repetition of the use of same material or different materials should be up to 10 steps, preferably up to 5 steps. Even when reaction is carried out in more than 10 steps effectiveness attained is less.

As for the amounts of use of (C) an electron donor, (D) an electron acceptor and solvent at the time of their reaction with a solid product (I), it is preferable that (C) is in the range of $1 \sim 5,000$ g, (D) is in the range of $1 \sim 5,000$ g and solvent is in the range of $0 \sim 5,000$ ml per 100 g of the solid product (I) in every time of reaction.

As for the reaction conditions, it is preferable that reaction temperature is in the range of $0° \sim 500°$ C., preferably $20° \sim 200°$ C., and preferable range of reaction time varies according to reaction state, e.g. one minute to 10 hours in the reaction carried out in suspension state, 5 to 200 hours for a ball mill and 10 minutes to 50 hours for a vibrating mill in case of reaction carried out by way of a milling machine. The reaction product between (C) and (D) in the mode (2-1), can be obtained by mixing the both at a temperature from room temperature (about 20° C.) to 150° C. for one minute or more.

Among the reaction modes above-mentioned, most preferable is (2-1), (2-4) or (2-5). In the modes of (2-4) and (2-5), a case where $SiCl_4$ is used as ($D_1$) and $TiCl_4$ is used as ($D_2$) is most preferable.

With regard to the reaction state at the time of practice of these modes, milling reaction is most preferable for reacting (D$_1$) SiCl$_4$ {singly, the mode (2-5) or together with (C), the mode (2-4)}, and suspension reaction is most preferable for reacting (D$_2$) TiCl$_4$. The number of reaction steps of (D$_2$) is most effective if it is one or two.

A product thus obtained will be referred to as a solid product (II).

The solid product (II) is taken out by subjecting a reaction liquid to distilling-off under subatmospheric or atmospheric pressure to remove unreacted (C) and (D) or to filtering-off or decantation, followed by washing with a solvent and drying, after completion of reaction. Alternatively, it is subject to repeated washings with a solvent after decantation, and used in the next reaction in the suspension state containing a solvent added.

The solid product (II) is combined with (E) an organoaluminum compound and (C) an electron donor.

The organoaluminum compounds used in the present invention include trialkylaluminums such as trimethylaluminum, triethylaluminum, tri-n-propylaluminum, tributylaluminum, tri-i-butylaluminum, tri-n-hexylaluminum, tri-i-hexylaluminum, tri-2-methylpentylaluminum, tri-n-octylaluminum, tri-n-decylaluminum, etc., dialkylaluminum monohalides such as diethylaluminum monochloride, di-n-propylaluminum monochloride, di-i-butylaluminum monochloride, diethylaluminum monofluoride, diethylaluminum monobromide, diethylaluminum monoiodide, etc., alkylaluminum dihalides such as ethylaluminum dichloride, i-butylaluminum dichloride; alkylaluminum hydride such as diethylaluminum hydride, alkylaluminum sesquihalides such as methylaluminum sesquichloride, ethylaluminum sesquichloride. In addition, alkoxyalkylaluminums such as monoethoxydiethylaluminum, diethoxymonoethylaluminum, etc. can also be used.

The electron donors (C) to be combined with a solid product (II) are the same with those described in the preparation of the solid product (II).

The amounts of (E) an organoaluminum compound and (C) an electron donor will be sufficient if (E) is in the range of 50~5,000 g and (C) is in the range of 2~2,000 g per 100 g of the solid product (II).

There are various kinds of methods for combining the above-mentioned three kinds of materials. For example, there are a method (1) in which (E), (C) and a solid product (II) are simultaneously mixed, a method (2) in which (E) and (C) are mixed and then a solid product (II) is added, a method (3) in which (E) and a solid product (II) are mixed and then (C) is added, a method (4) in which (C) and a solid product (II) are mixed and then (E) is added, and the like. Among these methods, a method of (1), (2) or (3) is preferable. After mixing or addition, it is possible to carry out a next addition or the use as a polymerization catalyst successively, but standing with stirring is often carried out before polymerization in order to improve catalyst performance. Among the above-mentioned methods, particularly good results are obtained, in this case when a method (1) or (2) is used.

The temperature at the time of the above-mentioned mixing or addition of (E), (C) and a solid product (II) will be preferable if it is in the range of 0°~100° C. and the elapse of time from the mixing of two substances till the addition of remaining substance will be preferable if it is in the range of zero second (simultaneous) to 50 hours.

The catalyst thus obtained is used for producing α-olefin polymers.

The α-olefins applied in the method of the present invention include ethylene, propylene, butene-1, hexene-1, heptene-1, octene-1, decene-1 and other straight chain monoolefins, 4-methyl-pentene-1, 2-methyl-pentene-1, 3-methyl-butene-1, and other branched chain monoolefins, butadiene, isoprene, chloroprene and other diolefins, styrene and the like. These can be subjected not only to homopolymerizations but also to copolymerization with other α-olefin e.g. propylene and ethylene, butene-1 and ethylene, propylene and butene-1, etc.

Polymerization reaction can be carried out in a hydrocarbon solvent such as n-hexane, n-heptane, n-octane, benzene, toluene and the like. Besides this, it can be carried out in an α-olefin e.g. liquefied propylene, liquefied butene-1 without using a solvent. In the practice, a polymerization temperature in the range of room temperature (about 20° C.) to 200° C., a polymerization pressure in the range of atmospheric (0 Kg/cm$^2$G) to 50 Kg/cm$^2$G, and as a usual time, 5 minutes to 10 hours are used. An appropriate amount of hydrogen can be added in order to control molecular weight at the time of polymerization.

The first effect of the present invention is the fact that molecular weight distribution can be controlled in a narrower range in the production of α-olefin polymers. Namely, if it is expressed by $\overline{M}w/\overline{M}n$ (wherein $\overline{M}w$ is a weight average molecular weight and $\overline{M}n$ is a number average molecular weight), a control can be made in the range of 3.5 to 7.0. Accordingly, when a shaped article having especially small strain is desired in the processing of injection molding or when characterized properties which depend upon molecular weight distribution, e.g. flow characteristic properties of molten polymer, impact strength, characteristic properties of torsion, tear, strength, surface gloss, etc. are desired to be controlled in a most preferable combination, the present invention shows especially effectivenesses.

The second effect of the present invention is capability of producing polymers of higher crystalinity in the production of α-olefin polymers. For example, in the production of propylene polymer, crystalline polypropylene as n-hexane-insoluble polymer amounts to 98%.

With the holding of the above-mentioned superior effectiveness, the present invention enables to hold the yield of polymer per solid product (II) or per transition metal at a high level as hereinafter described. Namely, the yield of α-olefin polymer per solid product (II) is sufficiently high, and particularly in the polymerization of propylene, it reaches up to $1 \times 10^4 \sim 2 \times 10^4$ g (polymer)/g. [solid product (II)] under a usual polymerization condition. No coloration and no degradation of physical properties of polymers occur and (such an adverse influence as rusting of mold at the time of shaping of polymers is not observed even if a step of removal of remaining catalyst, i.e. ash-removal step is omitted. Further a transition metal is utilized with an extremely higher efficiency and in case of common polymerization of propylene, efficiency reaches up to $1 \times 10^4 \sim 1 \times 10^6$ g (polymer)/g (transition metal atom).

Following Examples are offered by way of illustration but not by way of limitation.

EXAMPLE 1

(1) Preparation of solid product (II)

Aluminum trichloride (anhydrous) (130 g) and magnesium hydroxide (58 g) were reacted while being milled at 250° C. for 3 hours in a vibrating mill, whereby reaction occurred with accompaniment of generation of hydrogen chloride gas. After completion of heating, cooling was carried out in nitrogen stream and a solid product (I) was obtained.

Into a vibrating mill, 100 g of the solid product (I) and 22 g of ethyl cinnamate were charged and reacted while being milled at 40° C. for 5 hours. Thereafter 35 g of titanium tetrachloride was charged and reaction was carried out while being milled for another 20 hours. After completion of reaction, reaction product was washed twice each with 500 ml portion of n-hexane in a dry box the atmosphere of which had been replaced with nitrogen to obtain dried solid product (II).

(2) Preparation of propylene polymer

After replacement of the atmosphere of a stainless steel reaction tube having an inner volume of 1.5 l with nitrogen, 1 l of n-hexane, 342 mg of triethylaluminum, 45 mg of ethyl anisate and 18 mg of the solid product (II) were charged in this order with a period of one minute. After addition of 75 ml hydrogen, polymerization reaction was carried out under a partial pressure of propylene of 12 Kg/cm$^2$G, at 60° C. for 5 hours. After completion of the polymerization reaction, 50 ml of methanol was introduced into the reaction vessel to stop the polymerization reaction. The contents were poured on a Buffner's funnel, rinsed three times each with 500 ml of n-hexane and separated into a n-hexane-insoluble polymer (isotactic polypropylene) and a n-hexane-soluble polymer (atactic polypropylene) each of which was dried to obtain polymers. There were obtained 182 g of isotactic polypropylene and 3.7 g of atactic polypropylene. Polymer yield per 1 g of solid product (II) was 10,111 g of isotactic propylene and isotactic index which is expressed by a following formula was 98.0.

$$\frac{\text{amount of isotactic polymer (g)}}{\text{amount of isotactic polymer (g) + amount of atactic polymer (g)}} \times 100$$

(3) Measurement of molecular weight distribution

By using a gel permeation chromatographic apparatus (GPC 200 type manufactured by Waters Co., Ltd.) and o-dichlorobenzene as a solvent, a propylene polymer was dissolved and measurement of molecular weight distribution was carried out at a concentration from 0.1 to 0.5%, a temperature of 140° C. and a flow velocity of 1 ml/min. (the same procedure was used hereinafter). As the result, $\overline{Mw}/\overline{Mn}$ of propylene polymer obtained in Example 1 was 4.0.

COMPARATIVE EXAMPLE 1

By using the solid product (II) obtained in Example 1, polymerization reaction was carried out as in Example 1 without adding ethyl anisate at a time of polymerization of propylene. The molecular weight distribution was $\overline{Mw}/\overline{Mn} = 8.2$. Other results are summarized in Table 1.

EXAMPLE 2

To 20 g of the solid product (I) obtained in Example 1, 3.7 g of ethyl benzoate was added and reaction was carried out while being milled in a ball mill (diameter 100 mm, inner volume 785 ml, 80 balls having a diameter of 10 mm) at 40° C. for 80 hours, thereafter 20 g of the reaction product was suspended in 139 g of titanium tetrachloride, and then reaction was carried out at 60° C. for 3 hours. After completion of reaction, the product was filtered off in a dry box, washed three times each with 150 ml portion of n-hexane to obtain a solid product (II). By using said solid product (II), polymerization of propylene was carried out as in Example 1.

EXAMPLE 3

Aluminum trichloride (anhydrous) (60 g) and hydrotalcite ($Mg_6Al_2(OH)_{16}CO_3 \cdot 4H_2O$) (20 g) were reacted in a ball mill while being milled and heated at 80° C. for 80 hours to obtain a solid product (I).

To 20 g of the solid product (I), 3 g of titanium tetrachloride was added and reacted in a ball mill at 130° C. for 30 minutes, then unreacted titanium tetrachloride was removed under reduced pressure, then 2.5 g of a complex of tetrahydrofuran and titanium tetrachloride (2:1) was added and then reaction was carried out while being milled at 50° C. for 48 hours to obtain a solid product (II).

Polymerization of propylene was carried out as in Example 1 by using the solid product (II).

EXAMPLE 4

Aluminum trichloride (anhydrous) (133 g) and magnesium carbonate (98 g) were subjected to milling reaction while being heated in a ball mill at 180° C. for 48 hours to obtain a solid product (I). To 20 g of the solid product (I), 5 g of a complex of ethyl phenylacetate and titanium tetrachlorde (1:1) were added and milling reaction was carried out in a ball mill at 30° C. for 72 hours to obtain a solid product (II).

Polymerization of propylene was carried out as in Example 1 by using the solid product (II).

EXAMPLE 5

The solid product (I), (20 g) obtained in Example 4, was suspended in 100 ml of toluene and 12 g of methyl p-toluylate was added. After reaction at 100° C. for 30 minutes, filtering-off and drying were carried out. Then 20 g of the resulting solid was suspended in 500 g of titanium tetrachloride and reaction was carried out at 120° C. for one hour. After completion of reaction, a product was filtered off, washed three times each with 150 ml of n-hexane portion, and dried to obtain a solid product (II).

Polymerization of propylene was carried out as in Example 1 by using the solid product (II).

EXAMPLE 6

Aluminum trichloride (anhydrous) (120 g) and magnesium oxide (40 g) were reacted while being milled in a vibrating mill at 120° C. for 48 hours to obtain a solid product (I). Said solid product (I) (20 g), anisole (10 g) and titanium tetrachloride (100 ml) were added and reacted in the suspension state at 160° C. for 2 hours. Thereafter filtering-off, three time washing each with 150 ml n-hexane portions, and drying were applied to obtain a solid product (II).

Polymerization of propylene was carried out as in Example 1 by using the solid product (II).

EXAMPLE 7

After 20 g of the solid product (I) obtained in Example 6, 3 g of silicon tetrachloride and 3.0 g of ethyl benzoate were reacted while being milled in a ball mill at 40° C. for 48 hours, 7 g of titanium tetrachloride was introduced and further milling and reacting were carried out at 40° C. for 48 hours. Thereafter washing was carried out three times in a dry box each with 150 ml portion of n-hexane to obtain a solid product (II).

Polymerization of propylene was carried out as in Example 1 by using the solid product (II).

EXAMPLE 8

Ferric trichloride (anhydrous) (60 g) and aluminum-magnesium oxide ($MgAl_2O_4$) (70 g) were reacted in a vibrating mill at 320° C. for 5 hours to obtain a solid product (I).

Said solid product (I) (20 g) was suspended in 180 ml of toluene, 10 g of ethanol was added to the suspension, and after reaction at 30° C. for one hour, an operation consisting of addition of 150 ml of toluene and decantation, was repeated twice to turn the total volume to 180 ml by toluene. Then 8 g of benzophenone was added and after reaction at 60° C. for 30 minutes, decantation was carried out and 150 ml of toluene was added. After decantation and turning the total volume to 60 ml, 170 g of titanium tetrachloride and 20 ml of di-n-butyl ether were added and reaction was carried out at 130° C. for one hour to obtain a solid product (II).

Polymerization of propylene was carried out as in Example 1 by using the solid product (II).

EXAMPLE 9

A material (40 g) obtained by heating aluminum trichloride (anhydrous) (60 g) and hydromagnesite ($3MgCo_3.Mg(OH)_2.3H_2O$) at 100° C. for 2 hours, was milled and reacted in a vibrating mill at 250° C. for one hour to obtain a solid product (I).

Into 200 ml of n-hexane, 20 ml of methylhydrogenpolysiloxane, and 50 g of the above-mentioned solid product (I) were introduced and reacted in the state of suspension at 40° C. for one hour. Then the resulting product was filtered off, washed with n-hexane and dried. Resultant dried solid (20 g), methyl p-toluylate (2 g) and titanium tetrachloride (6 g) were charged in a ball mill. After milling reaction was carried out at 80° C. for 20 hours, a subatmospheric pressure was held at 80° C. for 2 hours to remove unreacted material and to obtain a solid product (II).

Polymerization of propylene was carried out as in Example 1 by using said solid product (II).

EXAMPLE 10

Polymerization of propylene was carried out as in Example 1 except that the solid product (II) obtained in Example 7 was used and 50 mg of methyl p-toluylate was used in place of ethyl anisate.

EXAMPLE 11

Aluminum trichloride (anhydrous) (133 g) and magnesium oxide (40 g) were milled in a ball mill for 24 hours, then heated at 120° C. for 2 hours. After cooling, a further milling was carried out for 10 hours to give a solid product (I).

Ethyl benzoate (12 g) and silicone tetrachloride (4.5 g) were mixed and reacted at room temperature (20° C.) in advance. Resultant product and 40 g of the solid product (I) were milled and reacted in a ball mill at 35° C. for 48 hours. Resultant powdery material (20 g) was suspended in 180 g of titanium tetrachloride. After reaction at 80° C. for 2 hours a supernatant liquid was removed by decantation, 180 g of titanium tetrachloride was added and reaction was carried out at 80° C. for one hour. After reaction, an operation consisting of addition of 150 ml of n-hexane and removal by decantation was repeated twice and a solid product (II) was obtained by filtering a product off and drying it.

Polymerization of propylene was carried out as in Example 1 by using the solid product (II).

EXAMPLE 12

Cumyl alcohol (2 g) and ethyl benzoate (5 g) were reacted with 20 g of the solid product (I) obtained by the operation same with that of Example 11, while they were milled in a ball mill at 40° C. for 48 hours. Then 9 g of silicon tetrachloride was added and subjected to milling reaction in a ball mill for 24 hours. The resultant powdery material (20 g) was suspended in 240 g of titanium tetrachloride and reaction was carried out at 100° C. for 2 hours. After reaction, a supernatant liquid was removed by decantation, an operation consisting of adding 150 ml of n-hexane and removal of supernatant liquid was repeated twice and a solid product (II) was obtained by filtering a product off in a dry box and drying it.

Polymerization of propylene was carried out as in Example 1 by using the solid product (II).

EXAMPLE 13

Methyl benzoate (12 g) was reacted with 40 g of the solid product (I) obtained in the operation same with that of Example 11 while they were milled in a ball mill at 30° C. for 24 hours. Then 15 g of silicon tetrachloride was added and milling reaction was carried out for another 48 hours to obtain powdery material, 20 g of which was suspended in 350 g of titanium tetrachloride and reaction was carried out at 80° C. for 2 hours. The resulting supernatant liquid was removed by decantation, 200 ml of tetrachloroethylene was added and decantation was carried out. Further an operation consisting of adding 200 ml of n-hexane and carrying out decantation was repeated twice and after distilling-off of n-hexane under subatmospheric pressure, a solid product (II) was obtained.

Polymerization of propylene was carried out as in Example 1 by using the solid product (II).

EXAMPLE 14

The solid product (I) (40 g) obtained according to the operation same with that of Example 11 and isopropyl benzoate (16 g) were reacted while being milled in a ball mill at 45° C. for 48 hours. Resultant powder (20 g) was suspended in 190 g of titanium tetrachloride and after reaction at 70° C. for 4 hours, reaction liquid was removed by filtering-off to give a solid which was suspended again in 220 g of titanium tetrachloride and reacted at 90° C. for one hour. The reaction liquid was removed by decantation. After twice repeating an operation consisting of addition of 250 ml n-hexane and decantation, a solid product (II) was obtained by distilling-off n-hexane under reduced pressure.

Polymerization of propylene was carried out as in Example 1 by using the solid product (II).

EXAMPLE 15

The solid product (II) (13 mg) obtained in Example 11, triethylaluminum (230 mg) and methyl p-toluylate (60 mg) were suspended in 500 g of liquefied propylene, 90 ml of hydrogen was added, and polymerization reaction was carried out at a polymerization temperature of 65° C. under a pressure of 26.5 Kg/cm$^2$G for 3 hours.

After completion of polymerization reaction, remaining propylene was removed to give 148 g of propylene polymer.

The results of Example 1~15 and Comparative example 1 are shown in Table 1. From these results, it can be seen that the method of the present invention is particularly superior in the values of $\overline{M}w/\overline{M}n$ and isotactic index.

TABLE 1

Results of Polymerization of Propylene

| | Content of titanium atom (mg/g) in solid product (II) | Polymer yield (g) per g . solid product (II) | Polymer yield (g) per g . titanium atom | Isotactic index | $\overline{M}w/\overline{M}n$ | MFR* |
|---|---|---|---|---|---|---|
| Example 1 | 20.8 | 15,400 | $7.4 \times 10^5$ | 98.0 | 4.0 | 6.8 |
| Comparative Example- 1 | " | 19,200 | $9.2 \times 10^5$ | 96.0 | 8.2 | 5.4 |
| Example 2 | 22.0 | 12,400 | $5.6 \times 10^5$ | 97.1 | 3.9 | 6.2 |
| Example 3 | 35.0 | 16,700 | $4.8 \times 10^5$ | 96.9 | 4.2 | 6.2 |
| Example 4 | 27.0 | 12,800 | $4.7 \times 10^5$ | 97.5 | 4.5 | 5.8 |
| Exampl3 5 | 30.2 | 13,200 | $4.4 \times 10^5$ | 97.0 | 4.0 | 5.4 |
| Example 6 | 32.0 | 11,800 | $3.7 \times 10^5$ | 97.2 | 4.8 | 4.9 |
| Example 7 | 28.0 | 18,100 | $6.5 \times 10^5$ | 98.0 | 4.0 | 4.8 |
| Example 8 | 22.3 | 10,900 | $4.9 \times 10^5$ | 96.9 | 4.2 | 7.1 |
| Example 9 | 29.4 | 16,500 | $5.6 \times 10^5$ | 97.5 | 4.1 | 6.5 |
| Example 10 | 20.8 | 17,100 | $8.2 \times 10^5$ | 97.0 | 4.0 | 6.0 |
| Example 11 | 19.0 | 14,800 | $7.8 \times 10^5$ | 98.0 | 4.3 | 6.1 |
| Example 12 | 22.0 | 12,400 | $5.6 \times 10^5$ | 98.1 | 3.9 | 5.8 |
| Example 13 | 16.0 | 13,200 | $8.3 \times 10^5$ | 97.1 | 4.2 | 4.9 |
| Example 14 | 18.0 | 14,300 | $7.9 \times 10^5$ | 97.3 | 4.1 | 3.8 |
| Example 15 | 19.0 | 11,380 | $6.0 \times 10^5$ | 97.0 | 4.2 | 6.1 |

*Melt Flow Rate, according to ASTM D-1238 (L)

EXAMPLE 16

Triisobutyl aluminum (430 mg) and isobutyl alcohol (20 mg) were mixed in 1 l of n-hexane and allowed to stand for 10 minutes. The solid product (II) (12 mg) obtained in Example 2 was added and polymerization reaction was carried out under a hydrogen partial pressure of 6 Kg/cm²G and an ethylene partial pressure of 7 Kg/cm²G, at 85° C. for 5 hours. The results are shown in Table 2.

EXAMPLE 17

Polymerization reaction of ethylene was carried out as in Example 16 after adding 380 mg of triethylaluminum, 10 mg of dimethylpolysiloxane and 8 mg of the solid product (II) obtained in Example 4 in this order within a period of one minute.

EXAMPLE 18

Polymerization of ethylene was carried out as in Example 16 after simultaneously adding 520 mg of tri-n-octylaluminum, 80 mg tri-n-octylphosphine and 15 mg of the solid product (II) obtained in Example 6.

COMPARATIVE EXAMPLE 2

Polymerization of ethylene was carried out as in Example 18, but without using tri-n-octylphosphine in the operation of Example 18.

EXAMPLE 19

Tri-n-butylaluminum (380 g), diphenyl ether (20 mg) and the solid product (II) (25 mg) obtained in Example 7 were added to a polymerization vessel, and after continuously feeding 480 g of butene-1 at 70° C. for 4 hours, polymerization reaction was carried out for 2 hours. After completion of reaction, the solvent was distilled off to obtain 290 g of polybutene.

EXAMPLE 20

Copolymerization of propylene-ethylene was carried out by using the solid product (II) obtained in Example 1.

The solid product (II) obtained in Example 1 (10 mg), triethylaluminum (420 mg) and ethyl p-toluylate (40 mg) were added to a polymerization vessel, 80 ml of hydrogen was introduced and polymerization reaction was carried out at a partial pressure of propylene of 10 Kg/cm²G for 4 hours and a polymerization temperature of 60° C. while ethylene was fed 8 times each in 10 g portion at an interval of 30 minutes. After reaction, propylene-ethylene copolymer was obtained as in Example 1. The yield of polymer per 1 g of the solid product (II) was 14,300 g (polymer) and isotactic index was 94.0

EXAMPLE 21

Copolymerixation of propylene-butene-1 was carried out as in Example 20.

An operation was carried out to copolymerize propylene-butene-1 as in Example 20 except that butene-1 was used in an amount of 20 g in place of ethylene in Example 20. The yield of polymer per 1 g of the solid product (II) was 12,300 g (polymer) and isotactic index was 95.0.

COMPARATIVE EXAMPLE 3

Polymerization of butene-1 was carried out as in Example 19 but without using diphenyl ether, in Example 19.

COMPARATIVE EXAMPLE 4

Copolymerization of propylene-ethylene was carried out as in Example 20 but without using ethyl p-toluylate in Example 20.

COMPARATIVE EXAMPLE 5

Copolymerization of propylene-butene-1 was carried out as in Example 20 but without using ethyl p-toluylate in Example 21.

The results of Examples 16~21 and Comparative examples 2~5 are shown in Table 2. Even in case of homopolymerization of α-olefins other than propylene, and copolymerization thereof with propylene, the superiority of the present invention can be noted.

TABLE 2

Results of Preparation of Polymers

| | Content of titanium atom (mg/g) in solid product (II) | Polymer yield (g) per g. solid product (II) | Polymer yield (g) per g. titanium atom | Isotactic index | $\overline{M}w/\overline{M}n$ | MFR |
|---|---|---|---|---|---|---|
| Example 16 | 22.0 | 18,200 | $8.3 \times 10^5$ | — | 3.6 | 4.1 |
| Example 17 | 27.0 | 16,300 | $6.0 \times 10^5$ | — | 4.0 | 4.3 |
| Example 18 | 32.0 | 19,400 | $6.1 \times 10^5$ | — | 3.8 | 5.2 |
| Comparative example 2 | 32.0 | 22,400 | $7.0 \times 10^5$ | — | 8.0 | 4.5 |
| Example 19 | 28.0 | 11,600 | $4.1 \times 10^5$ | — | 5.2 | |
| Example 20 | 20.8 | 14,300 | $6.9 \times 10^5$ | 94.0 | 4.8 | 5.2 |
| Example 21 | " | 12,300 | $5.9 \times 10^5$ | 95.0 | 4.9 | 4.8 |
| Comparative example 3 | 28.0 | 13,800 | $4.9 \times 10^5$ | — | 9.5 | |
| Comparative example 4 | 20.8 | 17,400 | $8.4 \times 10^5$ | 90.0 | 9.0 | 4.5 |
| Comparative example 5 | 20.8 | 15,300 | $7.4 \times 10^5$ | 91.0 | 8.8 | 6.2 |

What is claimed is:

1. In the method for producing α-olefin polymers by polymerizing α-olefins in the presence of a catalyst, said catalyst being obtained by
    (a) reacting one mol of a trivalent metal halide with 0.1–20 mols of a divalent metal compound to produce a solid product (I), said reaction being carried out by milling and heating at a temperature between room temperature and 500° C.,
    (b) reacting 1–5,000 g of *each of* at least one electron donor with 100 g of said solid product (I) in from one to ten steps in a suspension reaction manner or a milling reaction manner and at a temperature of between 0° C. and 500° C.,
    (c) reacting 1–5,000 g of *each of* at least one electron acceptor with 100 g of said solid product (I) in from one to ten steps, using TiCl₄ as an electron acceptor in at least one step, in a suspension reaction manner or a milling reaction manner, and at a temperature of between 0° C. and 500° C.,
    these two kinds of reactions (b) and (c) being carried out separately or simultaneously together to thereby form a solid product (II),
    (d) combining 100 g of said solid product with 50–5000 g of a trialkylaluminum and 2–2,000 g of an electron donor, said trivalent metal halide being selected from the group consisting of anhydrous AlCl₃ and anhydrous FeCl₃,
    said divalent metal compound being selected from the group consisting of Mg(OH)₂, MgCO₃, MgO, MgAl₂O₄, MgCO₃·Mg(OH)₂·3H₂O and Mg₆Al₂(OH)₁₆CO₃·4H₂O,
    said at least one electron donor being selected from the group consisting of compounds having the general formula RCOOR′, ROH, ROR′ or polysiloxanes characterized by the formula

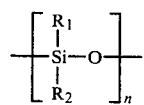

(wherein n=3 to 10,000 R₁ and R₂ represent the same or different substituents capable of connecting with silicon) and wherein in all of the foregoing formulas R and R′ are each, one hydrogen atom or a hydrocarbon group having 1 to 20 carbon atoms, said at least one electron acceptor being TiCl₄ or TiCl₄ and SiCl₄.

2. A method for producing α-olefin polymers according to claim 1 wherein said solid product (I), said electron donor and said electron acceptor are mixed and reacted in any order to obtain said solid product (II).

3. A method for producing α-olefin polymers according to claim 1 wherein a reaction product between said electron donor and said electron acceptor is further reacted with said solid product (I) to obtain said solid product (II).

4. A method for producing α-olefin polymers according to claim 1 wherein said solid product (II) is obtained by first reacting said solid product (I) with said electron donor and then reacting with said electron acceptor.

5. A method for producing α-olefin polymers according to claim 1 wherein said solid product (II) is obtained by reacting said solid product (I) with an electron donor (C₁) and then reacting with another electron donor (C₂) and an electron acceptor.

6. A method for producing α-olefin polymers according to claim 1 wherein said solid product (II) is obtained by reacting said solid product (I) with an electron acceptor (D₁) and then reacting with an electron donor and another electron acceptor (D₂).

7. A method for producing α-olefin polymers according to claim 1 wherein said solid product (II) is obtained by reacting said solid product (I) with an electron donor and an electron acceptor (D₁) and then reacting with another electron acceptor (D₂).

8. A method for producing α-olefin polymers according to claim 1 wherein 2 kinds of electron donors (C₁) and (C₂) in the coexistent state are reacted with a solid product (I), followed by reaction with a first electron acceptor (D₁) and then reacted with another electron acceptor (D₂) to thereby obtain a solid product (II).

9. A method for producing α-olefin polymers according to claim 1 wherein an electron donor (C₁) is first reacted with a solid product (I), then another electron donor (C₂) is reacted, then an electron acceptor (D₁) is reacted, and then another electron acceptor (D₂) is reacted to obtain a solid product (II).

10. A method for producing α-olefin polymers according to claim 1 wherein an electron donor (C₁) is reacted with a solid product (I), then another electron donor (C₂) is reacted, then another electron donor (C₂) and an electron acceptor (D) are reacted to obtain a solid product (II).

11. A method for producing α-olefin polymers according to claim 1, 2, 3 or 4 wherein reaction is carried out in a milling reaction manner by using $SiCl_4$ as an electron acceptor ($D_1$) and then reaction is carried out in a suspension reaction manner by using $TiCl_4$ as another electron acceptor.

12. A method for producing α-olefin polymers according to claim 1 wherein trialkylaluminum, an electron donor and a solid product (II) are combined by simultaneous mixing.

13. A method for producing 60-olefin polymers according to claim 1 wherein trialkylaluminum is mixed with an electron donor and then a solid product (II) is added to complete the combination.

14. A method for producing α-olefin polymers according to any one of claim 1 wherein trialkylaluminum and a solid product (II) are mixed and then an electron donor is added to complete the combination.

15. A method for producing α-olefin polymers according to claim 1 wherein said α-olefin is ethylene, propylene, or butene-1.

* * * * *